United States Patent [19]

Ozaki et al.

[11] Patent Number: 5,207,591
[45] Date of Patent: May 4, 1993

[54] BRANCH JUNCTION BOX AND BUSBARS FOR BRANCH CONNECTION

[75] Inventors: Keiichi Ozaki; Katsuaki Terada; Shinobu Tahara, all of Kosai, Japan

[73] Assignee: Yazaki Corporation, Tokyo, Japan

[21] Appl. No.: 913,424

[22] Filed: Jul. 15, 1992

Related U.S. Application Data

[62] Division of Ser. No. 841,778, Mar. 2, 1992, Pat. No. 5,160,274, which is a division of Ser. No. 641,423, Jan. 15, 1991, abandoned.

[30] Foreign Application Priority Data

| Jan. 16, 1990 | [JP] | Japan | 2-1628[U] |
| May 2, 1990 | [JP] | Japan | 2-46660[U] |
| Oct. 1, 1990 | [JP] | Japan | 2-102253[U] |
| Oct. 1, 1990 | [JP] | Japan | 2-102255[U] |
| Nov. 6, 1990 | [JP] | Japan | 2-115935[U] |

[51] Int. Cl.⁵ .................................. H01R 9/24
[52] U.S. Cl. ........................ 439/212; 439/724
[58] Field of Search ........... 439/34, 76, 212, 721-724; 174/71 B, 72 B, 129 B, 133 B

[56] References Cited

U.S. PATENT DOCUMENTS

| 2,824,901 | 2/1958 | Reichert et al. | 174/129 B |
| 3,391,378 | 7/1968 | Fisher | 439/212 |
| 4,954,090 | 9/1990 | Shimochi | 439/721 |

FOREIGN PATENT DOCUMENTS

| 2912944A | 10/1980 | Fed. Rep. of Germany . |
| 3731474A1 | 3/1989 | Fed. Rep. of Germany . |
| 3923205A1 | 2/1990 | Fed. Rep. of Germany . |
| 61-45575 | 3/1986 | Japan . |
| 61-180465 | 11/1986 | Japan . |
| 2-111213 | 4/1990 | Japan . |

*Primary Examiner*—Gary F. Paumen
*Attorney, Agent, or Firm*—Armstrong, Westerman, Hattori, McLeland & Naughton

[57] ABSTRACT

A branch junction box having an upper case and a lower case, with a plurality of connector insertion portions provided on the upper case. A plurality of parallel busbar accommodating grooves are formed in the lower case. A plurality of busbars are installed in the busbar accommodating grooves and have branched tabs which project upwardly via tab connecting portions into the connector insertion portions. The tab connecting portions include a rising piece extending upwardly from one edge of the busbar and a tab connecting piece extending laterally on one or both sides of the rising piece. The tab connecting pieces are bent at right angles to the plane of the busbar so that the branched tabs on the connecting pieces protrude sideways from the busbar. The tab connecting pieces are formed with the upwardly projecting branched tabs. An insulating plate is formed with a plurality of insertion slits at positions corresponding to the tab connecting portions of the busbars to pass and project the branch tabs and tab connecting portions through the insertion slits of the insulating plate. The insulating plate is slid laterally relative to the branched tabs to a position where it is securely held between the busbars and the tab connecting portions.

1 Claim, 16 Drawing Sheets

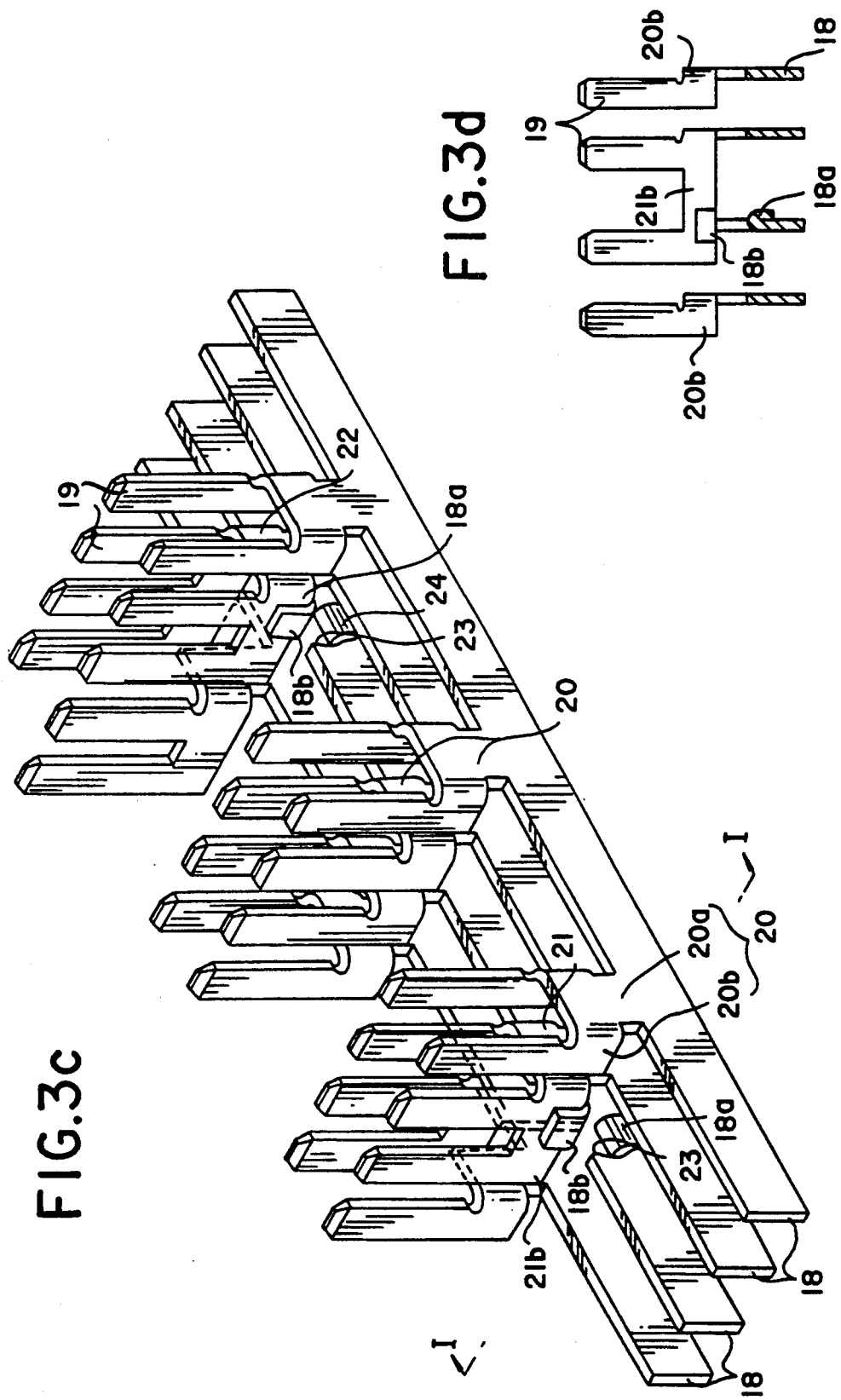

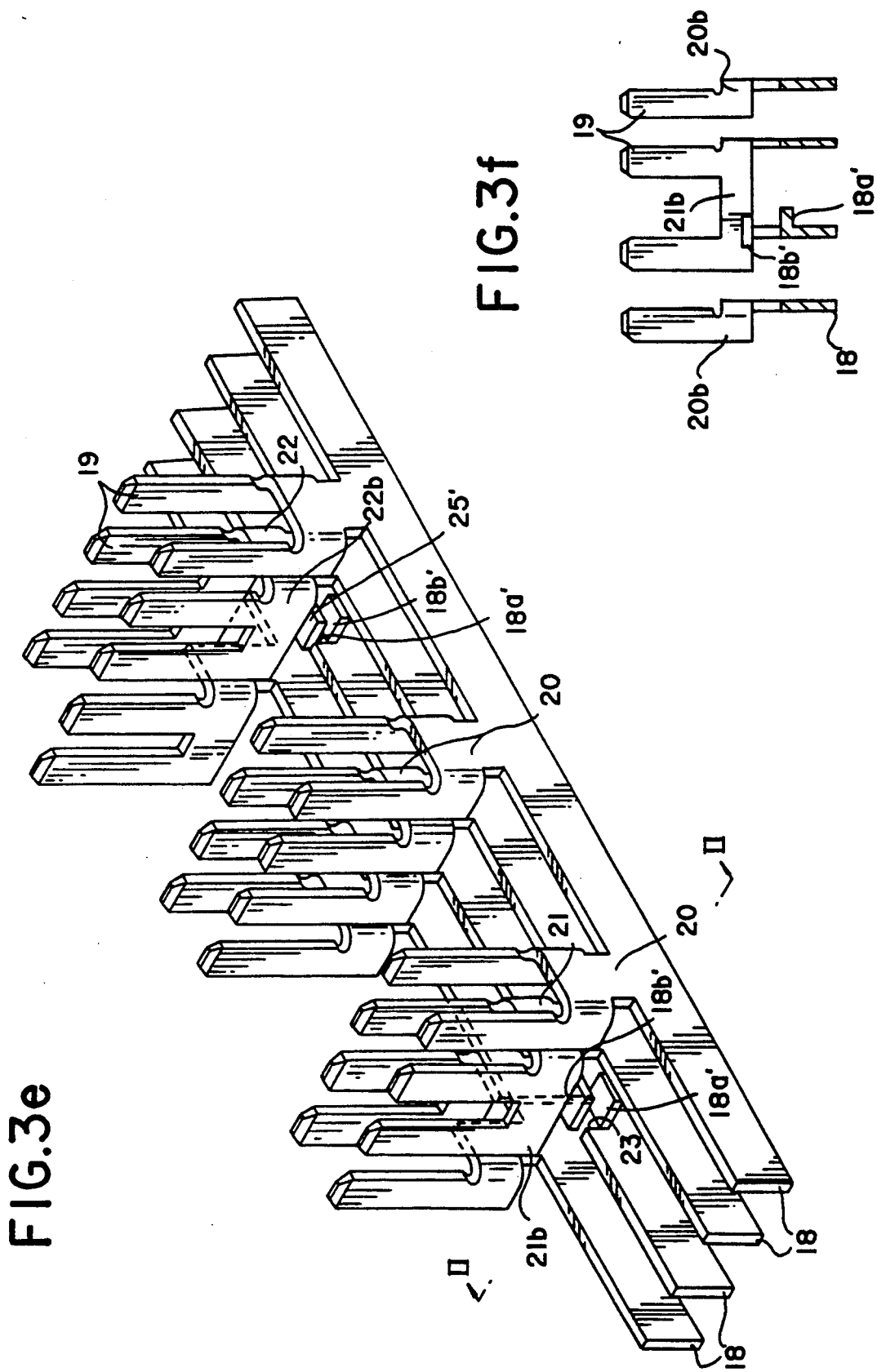

5,207,591

BRANCH JUNCTION BOX AND BUSBARS FOR BRANCH CONNECTION

This is a division of application Ser. No. 841,778 filed Mar. 2, 1992, now U.S. Pat. No. 5,160,274 issued Nov. 3, 1992, which in turn is a division of application Ser. No. 641,423 filed Jan. 15, 1991, now abandoned.

BACKGROUND OF THE INVENTION

The present invention relates to a branch junction box for interconnecting wiring harnesses in automobiles and also to comblike branch connection busbars used for forming branched circuits in the branch junction box.

PRIOR ART

A branch junction box is used for interconnecting electric wires in automobiles and has an advantage of accommodating joints of wiring harnesses to simplify the wiring configuration.

A method of making concentrated branched circuits which is currently available (as disclosed in the Japanese Patent Preliminary Publication No. Showa 61-45575) consists, as shown in FIG. 14, of the steps of: drawing out a group of wires 2A from wiring harnesses 1; placing the drawn-out parallel wires between an upper case 3 and a lower case 4; pushing a wire into a U-shaped slot 6a of a pressure contact portion 6 of a pressure terminal 5; projecting a branched tab 7 of the pressure terminal 5 through a hole or pit 3a in the upper case 3 to form a connector mounting portion 8; and then inserting a connector 9 of other group of wires 2B into the connector mounting portion 8.

Another interconnecting structure proposed by this applicant (in the Japanese Patent Application No. Showa 63-131708), as shown in FIG. 15, has one lateral edge of straight busbars 10 installed into busbar accommodating grooves 4a in a lower case 4' so that the busbars are arranged in parallel with each other, with other lateral edge of the busbars 10 pressed into U-shaped slots 6a' of pressure contact portions 6' of pressure terminals 5'.

The branch junction box shown in FIG. 14 is assembled integrally with the wiring harness 1, so that the assembly work cannot be performed separately, which is disadvantageous for the process control and inventory management. In the branch junction box of FIG. 15, the interval D between the adjacent busbars $10_1$ and $10_2$ is restricted by the width D' (D>D') of the pressure terminal 5', making high-density busbar arrangement difficult, which in turn will lead to an increased size of the branch junction box. Further, the busbars 10 and pressure terminals 5' are formed of rigid material such as punched-out metal plate. When, as shown in FIG. 16, the branched tab 7' is not correctly aligned with the associated holes 3a when the upper case 3 is mounted, the pressure terminal 5' becomes tilted, distorting the pressure contact portion 6', which, when the distortion exceeds the limit of elasticity, will sustain a plastic deformation, resulting in an open or broken circuit.

It is an object of this invention to provide a branch junction box which has high busbar circuit integration and thus can be formed compact and which prevents poor contact between the branched tabs and the busbars.

Another object of this invention is to provide branch junction box of a construction that can reliably prevent current leakage between busbars.

A further object of the invention is to provide a branch junction box of a construction that allows an increase in the number of internal circuits without changing the lateral dimensions of the case and that permits fixing and positioning of the branched terminals.

A further object of the invention is to provide comb-shaped, branch connection busbars which can be punched out and formed by a single die and which can be used commonly in the manufacture of busbars with different numbers of poles of branched tabs.

SUMMARY OF THE INVENTION

The branch junction box of this invention comprises: an upper case and a lower case; a plurality of connector insertion portions provided on the upper case; a plurality of parallel busbar accommodating grooves formed in the lower case at equal intervals; and a plurality of busbars each having one lateral edge thereof installed in the busbar accommodating groove and, at the other lateral edge, having branched tabs projected upwardly therefrom through tab connecting portions into the connector insertion portions; the tab connecting portions each consisting of a rising piece extending upwardly from the second lateral edge of the busbar, and a tab connecting piece extending laterally on one side or both sides of the rising piece; whereby the tab connecting pieces are bent at right angles to the plane of the busbar so that the branched tabs on them will protrude sideways from the busbar, the tab connecting pieces are further extended, as required, to cross adjacent busbars, and the extended portions of the tab connecting pieces are formed with upwardly projecting branched tabs.

In a preferred embodiment of the invention, the busbars are formed with notches at intersecting points with the tab connecting pieces, to prevent current leaks between the busbars.

In the above construction, since the branched tabs are formed integral with the busbar—a construction which is different from the pressure terminals 5, 5' of FIGS. 14 and 15—there is no possibility of bad contact and the contact pressing process can be eliminated reducing the number of assembly processes for the branch junction box.

The interval between the busbars need only be slightly wider than the bent portion of the tab connecting piece (or the width of the branched tab), permitting a high density circuit arrangement as a whole, which in turn leads to a reduction in the size of the branch junction box.

Where there is a need to lead out three or more poles of branched tab from the same part of the busbar, this can be accomplished by a tab connecting piece which extends to cross the adjacent busbars. This arrangement makes it easy to perform the branched tab alignment for each connector (or for each connector insertion portion).

To reliably prevent the, current leakage between the busbars, it is also preferred that a plurality of busbar accommodating grooves arranged parallel with each other at specified intervals be formed in opposing contact surfaces of the upper and lower cases and that raised and recessed walls that engage each other be provided to the opposing contact surfaces of the upper and lower cases between and along the busbar accommodating grooves.

With this construction, since the adjacent busbars are isolated from each other by the engagement of the raised wall and the recessed wall, the current leak between the busbars can reliably be prevented even when water seeps into the branch junction box.

Further, a branch junction box of the present invention which allows the number of circuits to be increased without changing the lateral dimensions of the case and which permits reliable fixing and positioning of the branched terminals has a construction which comprises: branch connection busbars each consisting of a strip of busbar, a plurality of tab connecting portions provided on the upper and lower lateral edges of the busbar, and a plurality of branched tabs projecting upwardly and downwardly from the upper and lower tab connecting portions, respectively, said upper and lower tab connecting portions being staggered; a pair of upper and lower cases for accommodating the branch connection busbars in such a manner that the busbars are parallelly arranged at specified intervals and that the upper and lower groups of branched tabs on the branch connection busbars are aligned in a direction perpendicular to the busbars, the upper and lower cases having tab insertion holes; a plurality of connector insertion portions provided to the outer surfaces of the upper and lower cases at positions corresponding to the upper and lower groups of branched tabs so that the connector insertion portions on the upper case and those on the lower case are staggered; and a plurality of seats provided to the inner surfaces of the upper and lower cases at positions corresponding to the lower and upper tab connecting portions; whereby the upper and lower branched tabs on each branch connection busbar are passed through the tab insertion holes in the upper and lower cases and projected into the connector insertion portions, and the upper and lower tab connecting portions are firmly held between one case and the seats of the other case.

To facilitate the work of assembling the branch connection busbars into the upper and lower cases and also the work of positioning the branched tabs, it is it is also preferred that the seats of at least one of the upper and lower cases are formed with insertion grooves into which the tab connecting portions are inserted.

With the above construction, since the upper and lower groups of tab connecting portions on the branch connection busbars are firmly held between one case and the seats of another case, the branched tabs and also the branch connection busbars can be prevented from becoming loose or dislocated by external force produced when external connectors are mounted to or dismounted from the connector insertion portions.

Further, since the seats in one of the cases are provided with insertion grooves that guide the tab connecting portions into predetermined positions, the alignment of the branched tabs as well as the mounting of the other case (insertion of the branched tabs through the tab insertion holes) are made easy.

Further, a comblike branch connection busbar, that can be used commonly in the manufacture of various kinds of busbars with different numbers of branched tab poles, has a construction in which a plurality of parallel branched tabs project perpendicularly from one side of a laterally extending base strip through perforated portions that are spaced at specified intervals.

BRIEF DESCRIPTION OF THE DRAWINGS

FIG. 3c is an enlarged perspective view of a part of busbars as another embodiment of this invention;

FIG. 3d is a cross section taken along the line I—I of FIG. 3c;

FIG. 3e is an enlarged perspective view of a part of busbars as a variation of FIG. 3c;

FIG. 3f is a cross section taken along the line II—II of FIG. 3e;

FIG. 6 is a perspective view of a branch connection busbar;

FIG. 7 is an exploded perspective view of a branch junction box;

FIG. 8 is an enlarged perspective view of seats as shown in FIG. 7;

FIG. 9 is a cross section showing an essential portion of the branch junction box in an assembled state;

FIG. 10 is a plan view showing the branch connection busbar A' and the seats 43 of FIG. 7 in an assembled state;

PREFERRED EMBODIMENT OF THE INVENTION

Figure 1:
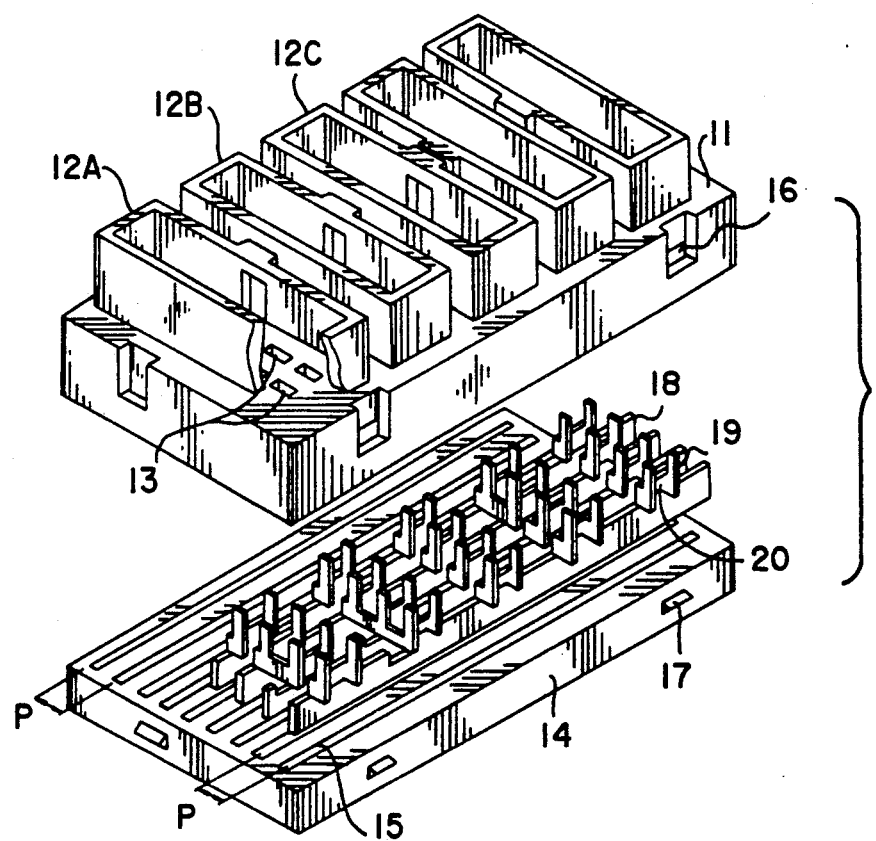
FIG. 1 is an exploded perspective view of a branch junction box as a first embodiment of this invention.

In FIG. 1, reference numeral 11 represents an upper case, on the upper surface of which are erected a plurality of connector insertion portions 12A, 128, . . . that each have an array of tab insertion holes 13 formed in their bottom walls. Denoted 14 is a lower case, in the upper surface of which a plurality of parallel busbar accommodating grooves 15 are formed at a constant pitch P. Designated 16 and 17 are engagement portions and engagement claws, that together form a locking means for locking the upper and lower cases 11, 14 together.

Straight busbars 18 each have a plurality of branched tabs 19 erected at the upper lateral edge thereof through tab connecting portions 20. The lower edge of each straight busbar 18 is securely installed in the busbar accommodating groove 15. The branched tabs 19 pass through the tab insertion holes 13 and project into the connector insertion portions 12A, 12B, . . . , to which corresponding connectors of wiring harnesses not shown are connected.

Figure 2:
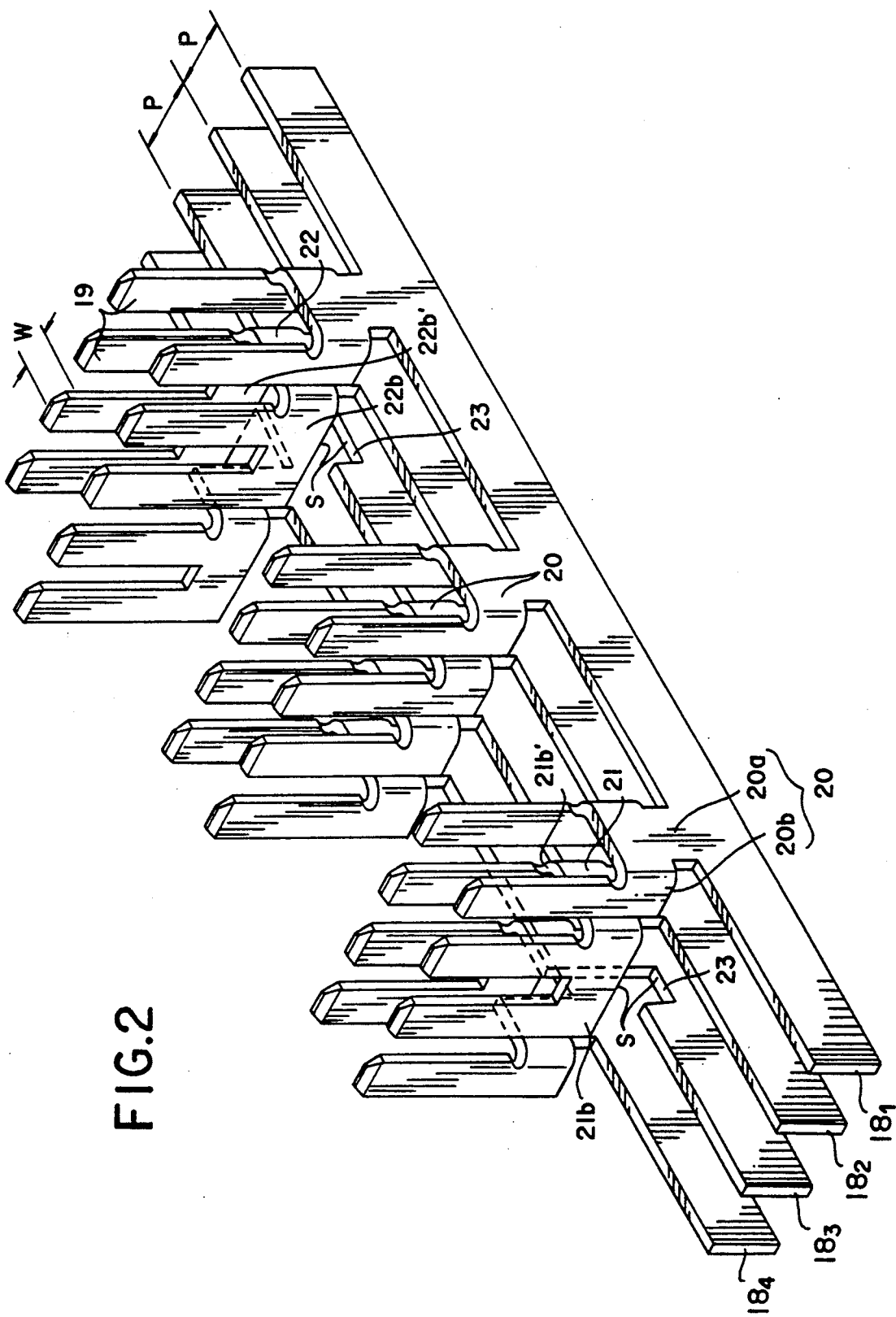
FIG. 2 is an enlarged perspective view showing a part of busbars of FIG. 1.

FIG. 2 is an enlarged perspective view of a group of busbars 18 as shown in FIG. 1. In FIG. 2, the busbars are assigned reference numerals $18_1$, $18_2$, $18_3$, $18_4$, from the front toward the rear, to make them distinguishable.

The busbar $18_1$ has T-shaped tab connecting portions 20 formed integral with its upper edge and spaced from each other at pitches corresponding to the connector mounting portions 12A, 12B, . . . The T-shaped tab connecting portions 20 each consist of a rising piece 20a and tab connecting pieces 20a, extending laterally from each side of the rising piece 20a. The tab connecting pieces 20b each have a branched tab 19 projecting upwardly from the lateral ends thereof. The tab connecting pieces 20b are bent at right angles with respect to the plane of the busbar $18_1$, so that the two branched tabs 19 are located between the busbars $18_1$ and $18_2$ and face each other at positions deviated sideways from the busbar $18_1$. One or both of the two branched tabs 19 may be bent in the opposite direction as shown in an imaginary line (two-dot line).

Figure 3A:
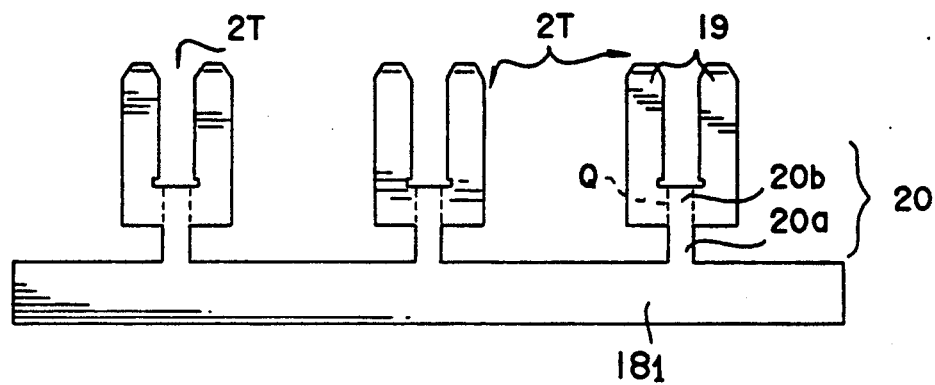
FIGS. 3a and 3b are developed views of busbars $18_1$, $18_2$, respectively, of FIG. 2.

FIG. 3a is a developed view of the busbar $18_1$, tab connecting portions 20 and branched tabs 19, punched out from a single conductive metal plate. Bending the tab connecting portions 20 along the dashed line Q forms the busbar $18_1$ with two-branch tabs 19 of FIG. 2.

This busbar $18_1$ having the laterally symmetrical T-shaped tab connecting portions 20 constitute the basic structure of the busbars employed in the branch junction box of this invention.

Figure 3B:
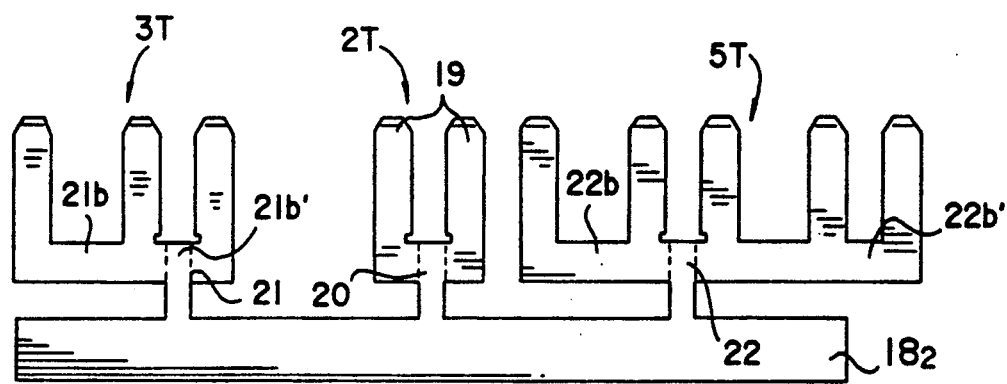
Figure 3G:
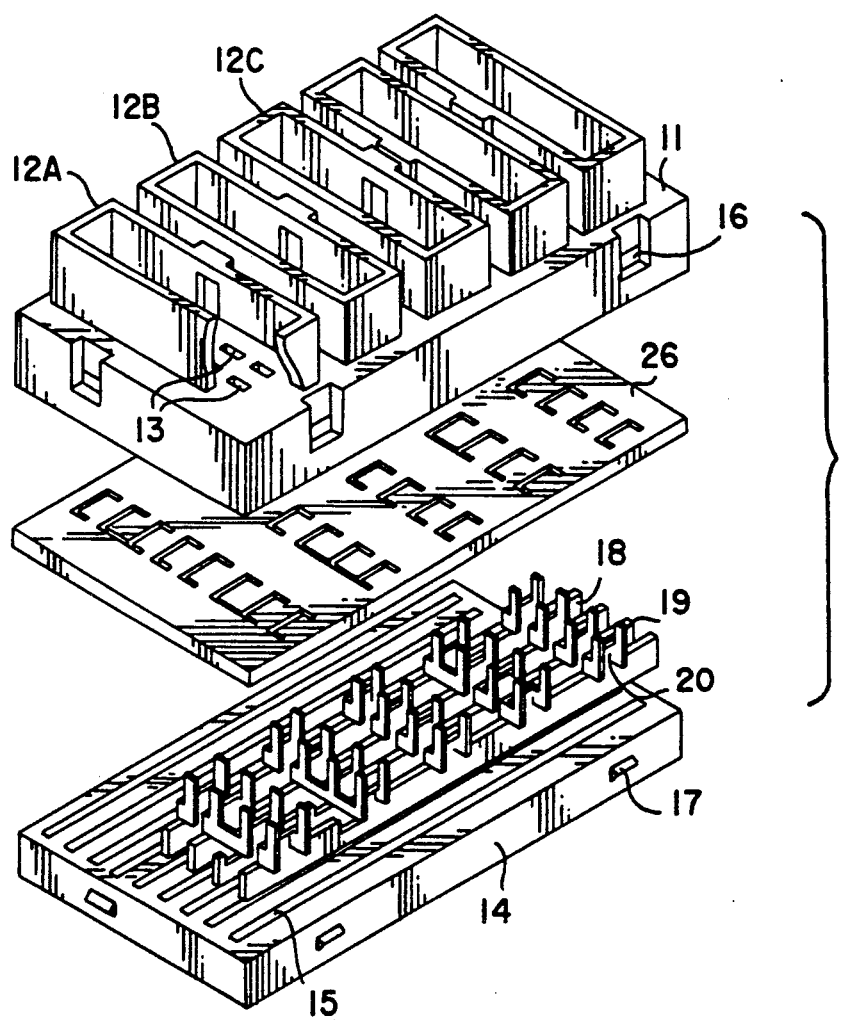
FIG. 3g is an exploded perspective view of another branch junction box according to this invention.

The busbar $18_2$ has a tab connecting portion similar to the one mentioned above at the center and also laterally non-symmetrical T-shaped tab connecting portions 21 and 22 on each side. FIG. 3b shows a developed view of the busbar $18_2$ and its integrally formed tab connecting portions 20, 21, 22.

The tab connecting portion 21 has its left tab connecting piece 21b extended to cross the adjacent busbar $18_3$ until its front end reaches a point between the busbars $18_3$ and $18_4$, with two branched tabs 19 projecting upwardly. On the other hand, the right tab connecting piece 21b' has the same structure as the basic busbar structure. Similarly, the tab connecting portion 22 has the left tab connecting piece 22b formed in the same construction as the tab connecting piece 21b, while the right tab connecting piece 22b' extends beyond the busbar $18_4$ and has three branched tabs 19.

Notches 23 are formed in the busbars $18_3$ and $18_4$ where the tab connecting pieces 21b, 22b, 22b' cross these busbars, so as to prevent current leaks among busbars. The branched tabs 19 are of course not provided at the notches 23 in the busbars $18_3$, $18_4$.

By elongating the tab connecting pieces 21b, 22b of the tab connecting portions 21, 22 across the adjacent busbar $18_3$, it is possible to extract a plurality of branched tabs 19 from the same point of the busbar, if necessary, and to arrange the branched tabs 19 in desired arrays for each of the connector mounting portions 12A, 12B, . . .

As is evident from FIG. 2, the pitch P or interval between the busbars need only be slightly larger than the width W of the branched tab 19 (or the bent portion of the tab connecting piece 20b), allowing the busbars $18_1$, $18_2$, $18_3$ to be arranged closer together. Even when the tab connecting piece 21b extends crossing the adjacent busbar $18_3$, the pitch P remains unchanged. Since the series of branched tabs 19 formed on each of the busbars $18_1$, $18_2$ can easily be formed by punching a conductive metal plate and bending the punched-out plate, as shown in FIGS. 3a and 3b, it is possible to make accurate position alignment between the branched tabs 19 and the tab insertion holes 13 in each connector mounting portion 12A, 12B, . . .

In another embodiment shown in FIGS. 3c and 3d, the busbars 18 ($18_1$ to $18_4$), formed of a partly tin-plated copper-zinc alloy, have folded pieces 18a, 18b—which are bent 180 degrees formed at the notches 23 and at the tab connecting pieces 21b, 22b of the tab connecting portions 21, 22 that face the notches in order to enhance the current leakage prevention capability.

That is, in FIG. 3, the busbars 18 and the branched tabs 19 are formed by punching and thus the conductive metal is exposed at the surface S of the notches 23 and at the lower end surface S of the tab connecting pieces 21b, 22b that face the notches. The presence of water between these surfaces will form a bridge resulting in a current leakage.

The folded pieces 18a, 18b, however, make such current leakage less likely because their opposing surfaces have the tin layer plated thereover, which is a poor conductor, preventing the formation of a current path between the conductive metals even when there is water bridging the opposing folded pieces.

The 180-degree folded pieces 18a, 18b may be replaced with 90-degree folded pieces 18a', 18b' as shown in FIGS. 3e and 3f.

Figure 3H:
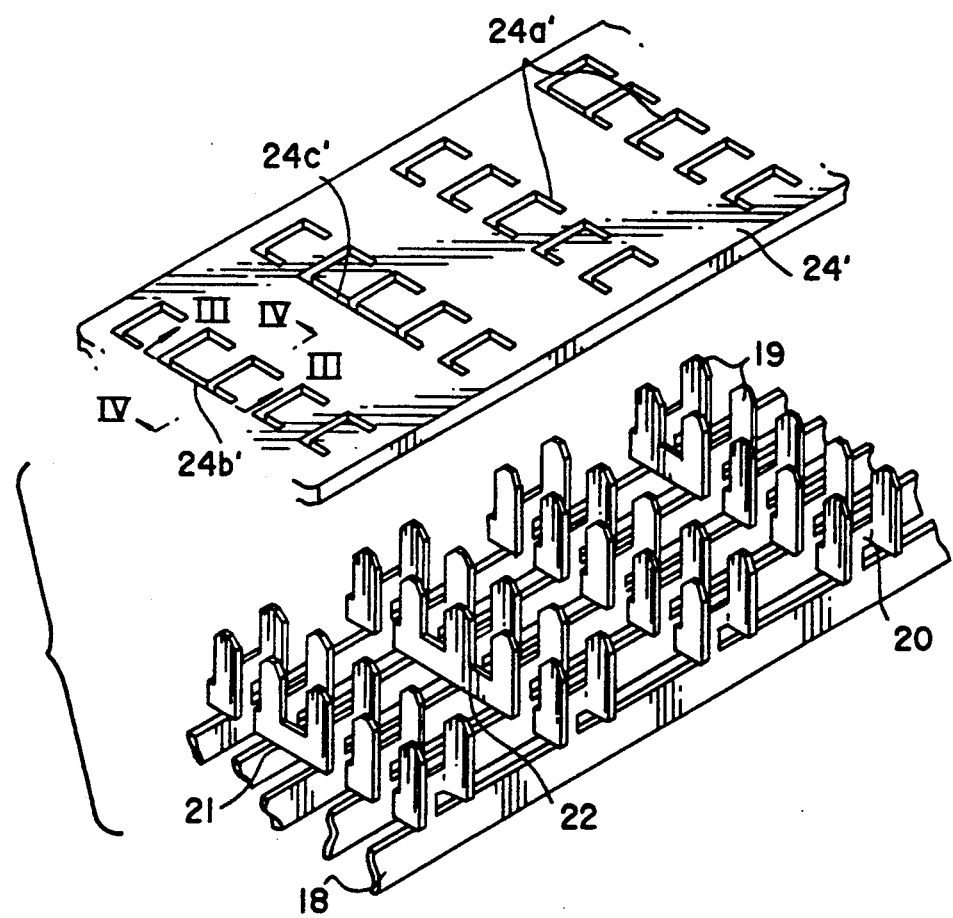
FIGS. 3h through 3j are enlarged perspective views showing the process of assembling busbars 18 and an insulating plate 24' of FIG. 3g.

Another embodiment shown in FIGS. 3g to 3p has an insulating plate 24' interposed between the busbars 18 and the branched tabs 19 to prevent current leakage between the busbars. As shown in FIG. 3h, the insulating plate 24' is formed, at positions corresponding to the array of branched tabs 19 of the busbars 18, with U-shaped insertion slits 24a, that receive the tab connecting portions 20 of the basic structure and also with insertion slits 24b', 24c' that receive the tab connecting portions 21, 22 with varying number of branched tab poles.

Figure 3I:
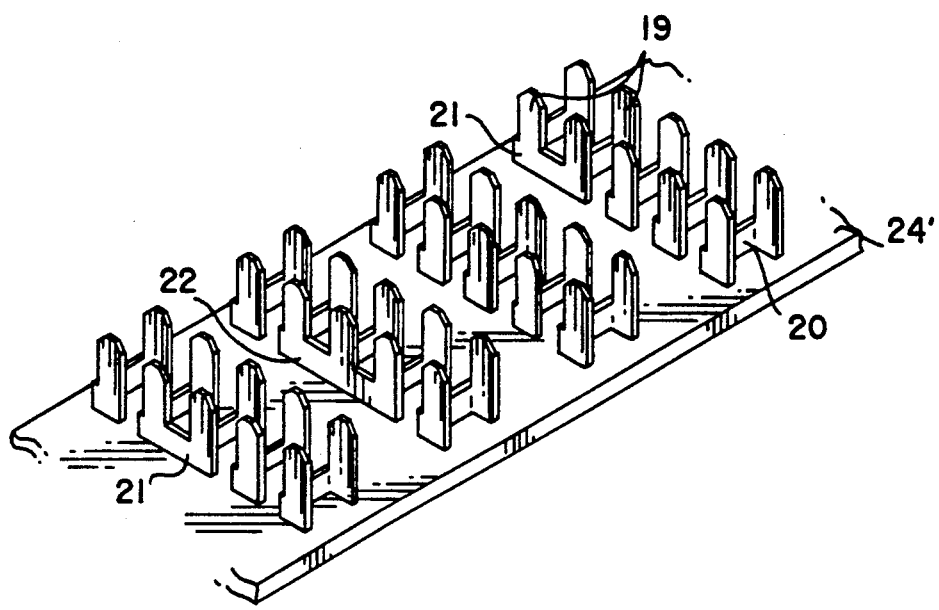
Figure 3J:
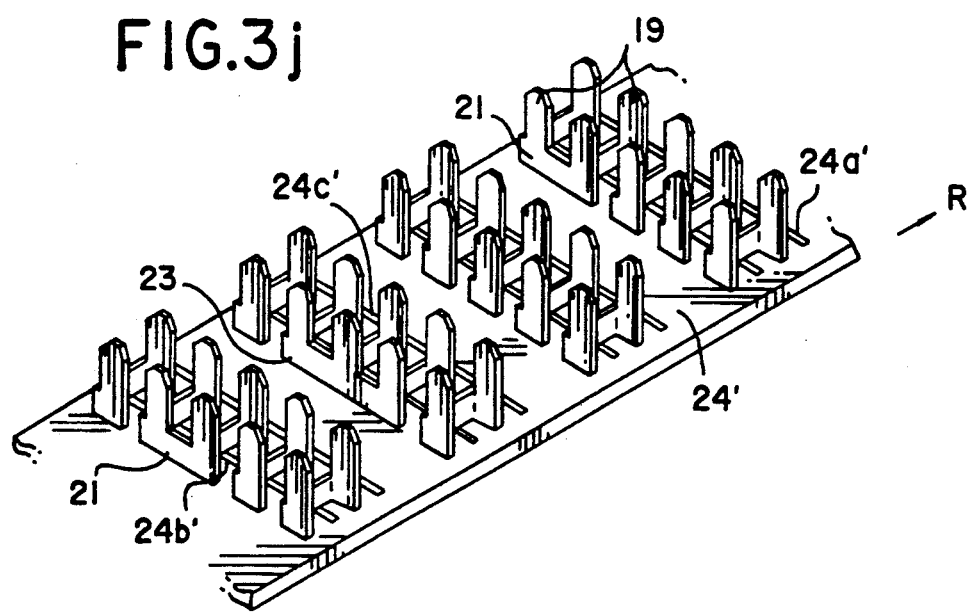
Figure 3K:
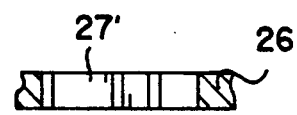
FIGS. 3k through 3m are cross sections taken along the line III—III of FIG. 3h, showing the assembly process.
Figure 3K:
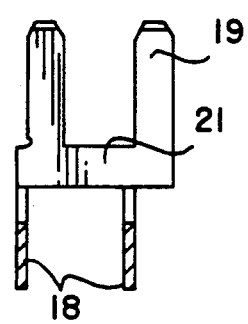
Figure 3N:
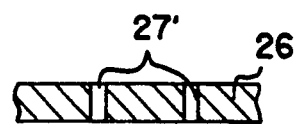
FIGS. 3n through 3p are cross sections taken along the line IV—IV of FIG. 3h.
Figure 3N:
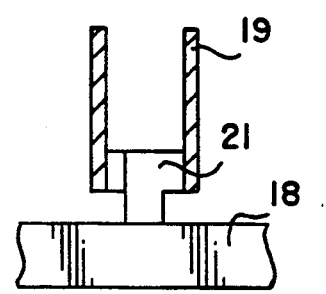
Figure 3L:
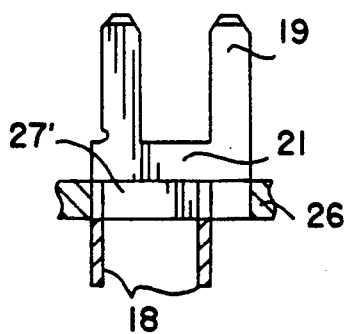
Figure 3O:
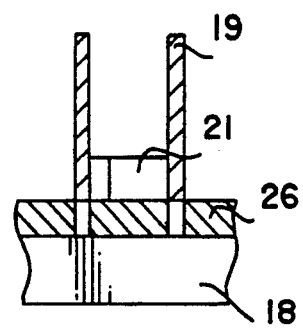
Figure 3M:
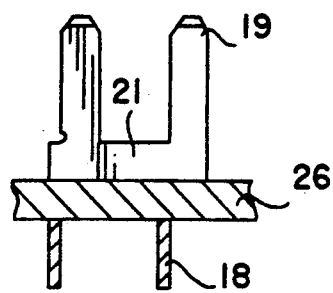
Figure 3P:
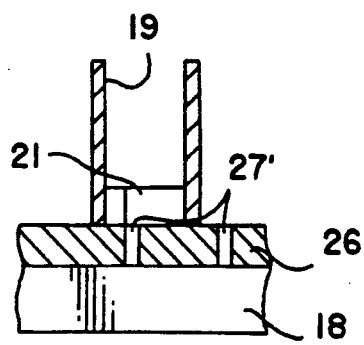

As shown in FIG. 3i, the insulating plate 24' is placed over the busbars 18 mounted on the lower case 14 (see FIG. 1) in such a way as to allow the branched tabs 19 and the tab connecting portions 20 to 22 to pass through and project from the insertion slits 24a' to 24c'. Then the insulating plate 24' is slid in the direction of arrow R as shown in FIG. 3j.

As a result, as shown in the cross-sectional views of FIGS. 3k to 3m and FIGS. 3n to 3p, the insulating plate 24' is securely held between the busbars 18 and the tab connecting portions 20 to 22 and isolates the branched tabs 19 and the adjacent busbars 18. Since the insulating plate 24' is slid as shown, the tab connecting portions 20 to 22 and the branched tabs 19 are displaced from the insertion slits 24a' to 24c'. Hence, if water attaches to the branched tabs 19 projecting from the insulating plate 24', there is no possibility of the water forming a bridge between the branched tabs 19 and the adjacent busbars 18 through the tab connecting pieces 20b (21b, 22b), further enhancing the current leakage prevention effect.

This embodiment eliminates the need to provide the notches 23 for the tab connecting pieces 20b to 22b that extend across the busbars 18. This in turn permits the overall height of the branch junction box to be reduced.

Figure 4:
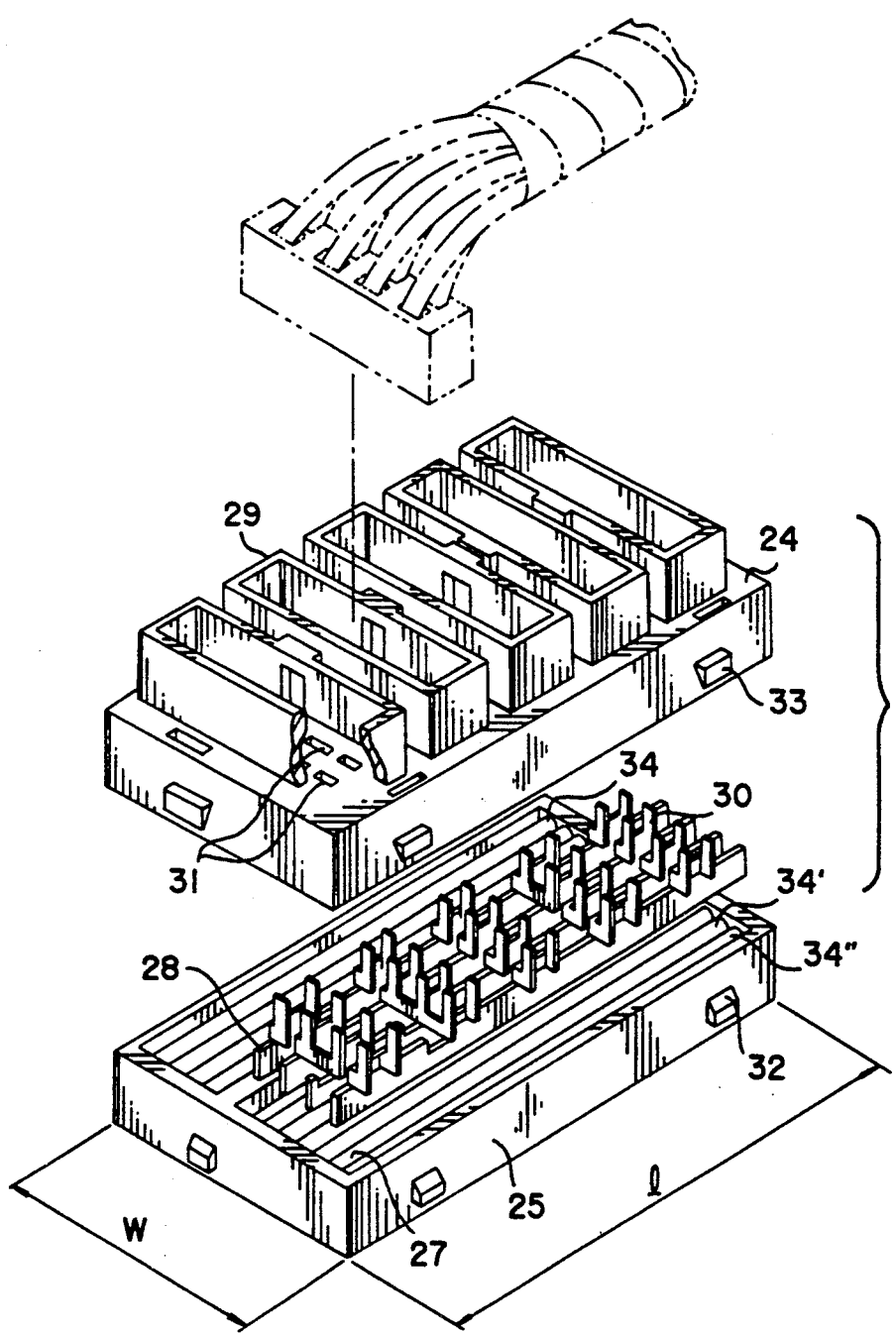
FIG. 4 is an exploded perspective view of a branch junction box as a second embodiment of the invention.
Figure 5:
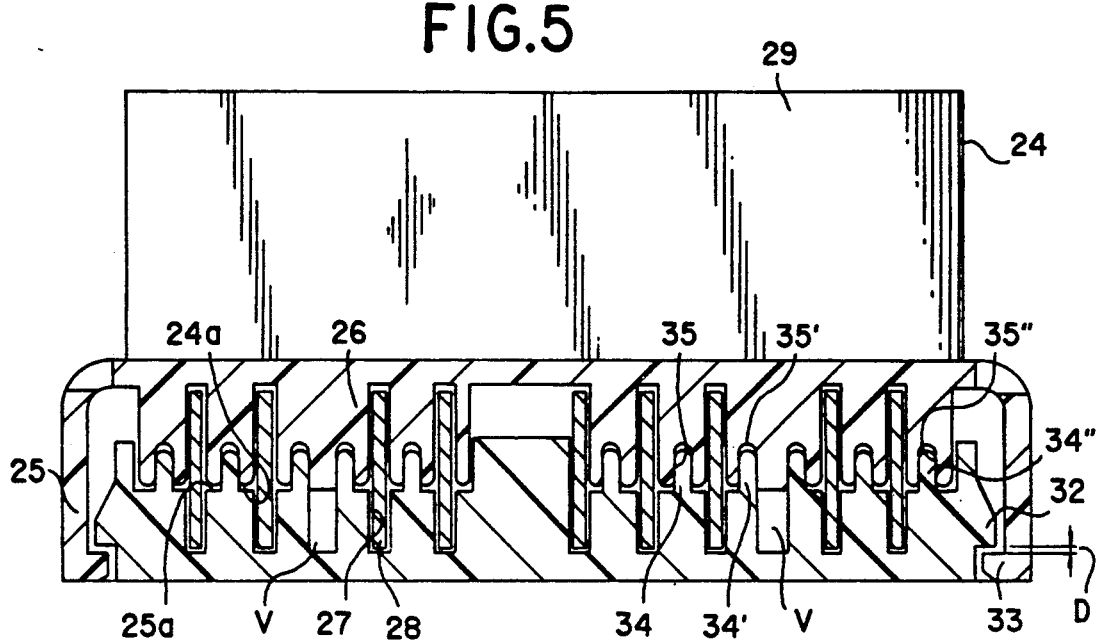
FIG. 5 is a cross section showing an essential portion of the branch junction box of FIG. 4 in an assembled state.

In FIGS. 4 and 5, the contact surface 25a of the lower case 25 is provided with three kinds of raised walls 34, 34', 34" along the busbar accommodating grooves 27. The raised wall 34 is provided at the middle of the two busbar accommodating grooves 27, 27; the second raised wall 34' is provided on each side of a hollow portion V formed in the lower case 25; and the third raised wall 34" is provided close to the outer edge of the lower case 25.

The contact surface 24a of the upper case 24 is provided with recessed walls 35, 35', 35" that engage with the corresponding raised walls 34, 34', 34".

The height of each raised wall from the contact surface 25a is set sufficiently large so that the depth of engagement between the raised walls and the recessed walls is larger than the overstroke D between the locking claw 32 and the engagement portion 33, the locking claw 32 and the engagement portion 33 forming a locking portion. The width of each raised wall 34, 34', 34" is set equal to that of each recessed wall 35, 35', 35". These raised and recessed walls are preferably sized so that they can be engaged with each other in an air tight contact condition or in a pressure contact condition.

In FIGS. 4 and 5, reference numerals 28 represents busbars, 29 connector insertion portions, 30 branched tabs, 31 tab insertion holes, and 32 and 33 engagement claws and engagement portions, both forming a locking means.

With this construction, even when water seeps into the branch junction box, the adjacent busbars 28 are isolated from each other by the engagement between the raised walls 34 or 34' and the recessed walls 35 or 35', so that current leakage among the busbars can be prevented.

The raised wall 34 (34', 34") and the recessed wall 35 (35', 35") have the effect of increasing the distance that the water must move in seeping from one busbar accommodating groove 27 to another, thereby delaying and preventing the ingress of water.

While in the above example, the raised walls are provided to the lower case 25 and the corresponding recessed walls to the upper case 24, it is possible to reverse or even mix them.

In the branch junction boxes that accommodate lateral busbars as internal circuit components, the above construction reliably prevents current leakage between busbars.

In the branch junction box shown in FIG. 4, when one wants to increase the number of internal circuits and enhance the joint capacity, the length; of the case or its width w should be increased. However, the limited space in the automobiles restricts the lateral dimension of the junction box.

Figure 6:
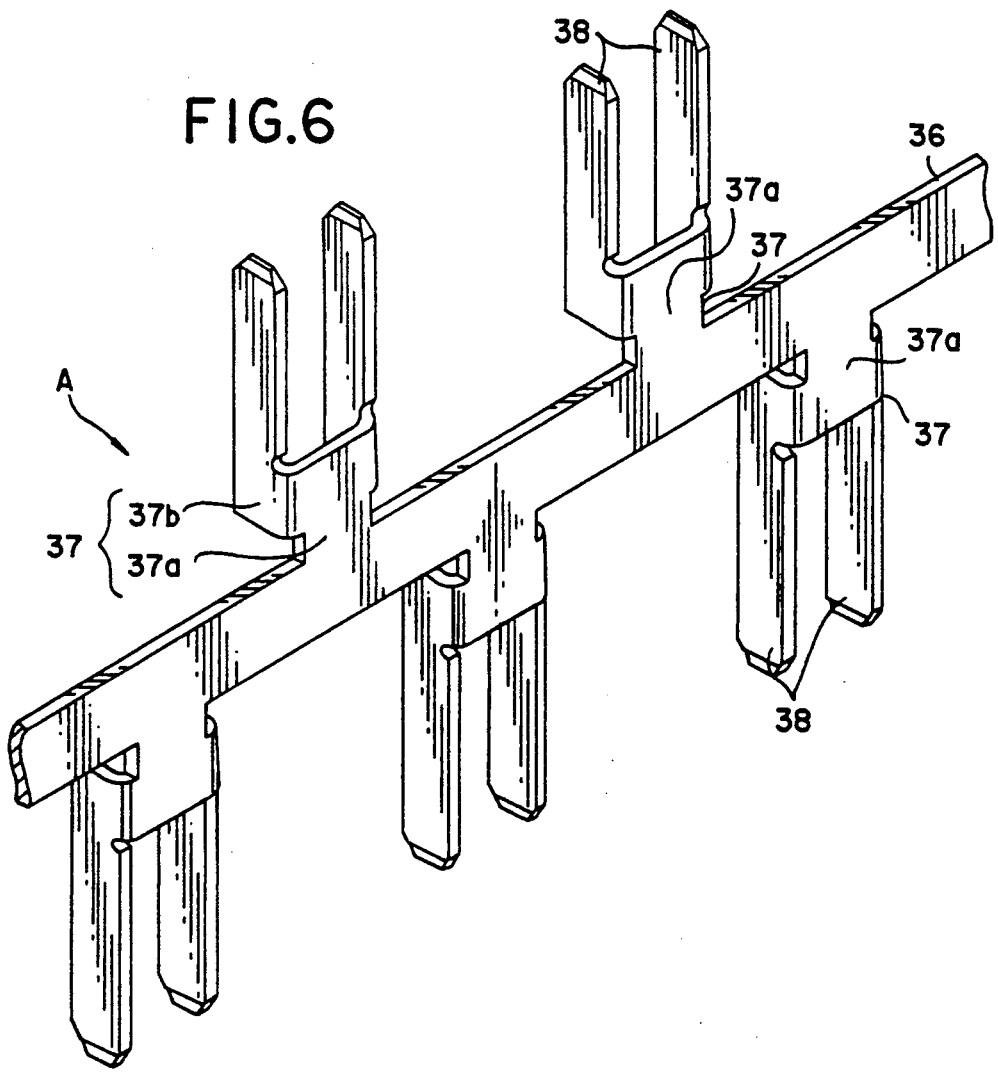
FIGS. 6 through 10 show a third embodiment of the invention.

A possible solution to this problem may be to form the rising pieces 37a of the tab connecting portions 37 on both the upper and lower edges of the busbar 36 alternately, as shown in FIG. 6 in which the branched tabs 38 are shown provided on each side of the busbar 36 to form a branch connection busbar A. In this case, however, a wiring board of FIG. 1 (the lower case 14 with busbar accommodating grooves 15) to accommodate the busbars 18 cannot be used, giving rise to another problem of fixing the branched tabs 38.

The branch junction box shown in FIGS. 7 to 10 has been realized to overcome the above drawback.

Figure 7:
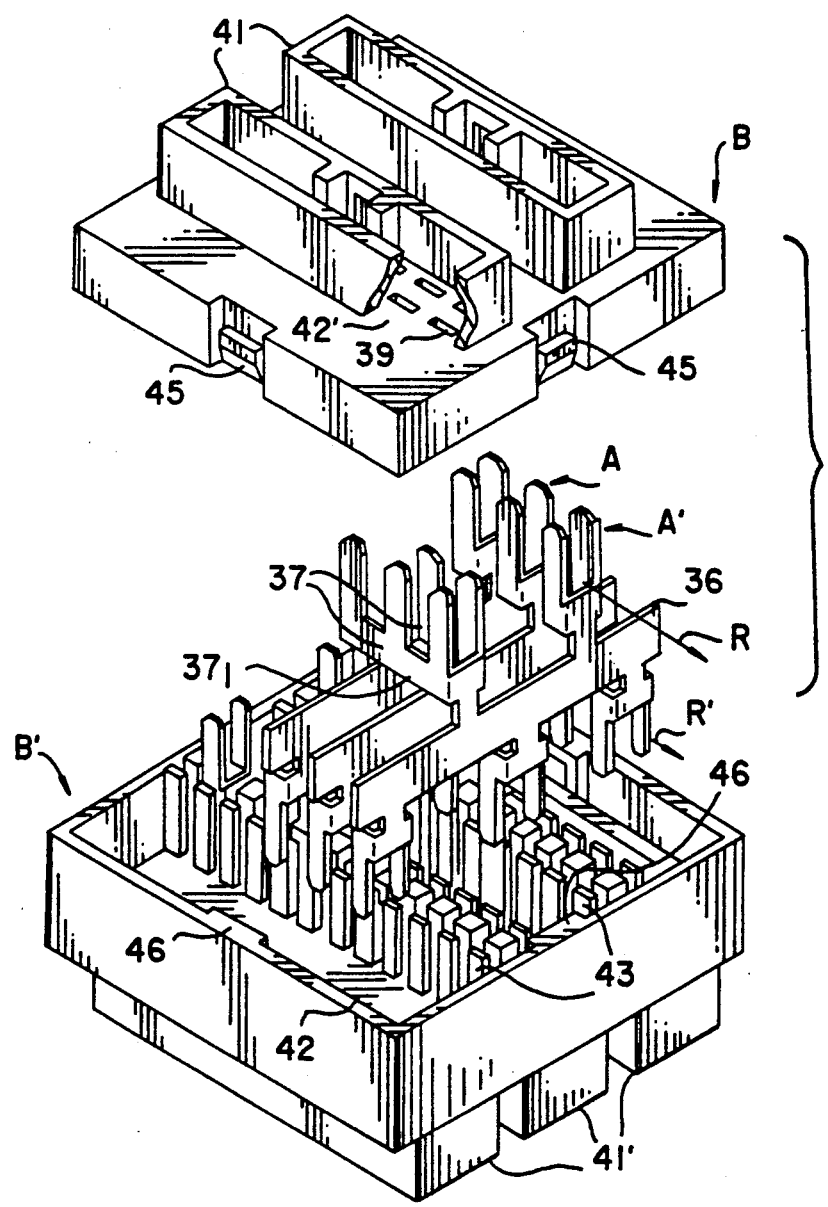
Figure 8:
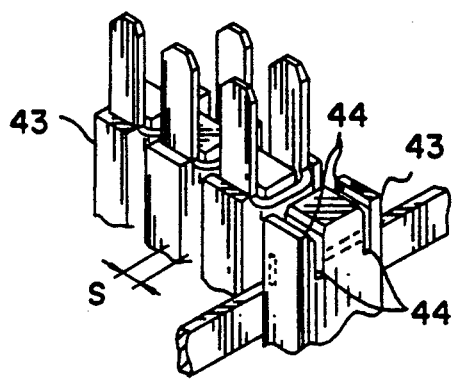

In FIGS. 7 and 8, designated A and A' are branch connection busbars; denoted B and B' are an upper case and a lower case, respectively, both formed of synthetic resin.

The branch connection busbar A' has the same basic construction as that of the branch connection busbar A. What the branch connection busbar A' differs from the latter busbar A is that the upper tab connecting portion $37_1$ has its tab connecting pieces $37b_1$, $37b_2$ extended to cross the adjacent busbars 36 to form a five-pole branched tab 38.

A plurality of branch connection busbars A, A' arranged as follows and accommodated in the cases B, B'. The busbars 36 are parallelly arranged at certain pitches and upper and lower groups of the branched tabs 38 are arrayed in the directions of arrows R, R' perpendicular to the busbars 36.

The upper case B and the lower case B' are provided on their outer surfaces with two connector insertion portions 41 and three connector insertion portions 41', respectively, at positions that correspond to the upper and lower groups of branched tabs 38 of the branch connection busbars A, A' so that the upper connector insertion portions and the lower connector insertion portions are staggered from each other. The connector insertion portions each have an array of tab insertion holes 39 formed therein.

A bottom wall 42 of the lower case B' is provided with a plurality of projecting seats 43 for the upper tab connecting portions 37 of the branch connection busbars A, A', the seats 43 being arrayed in the direction of arrow R. The upper end surface of each seat 43 is cut with grooves 44 on each side, into which the tab connecting pieces 37b of the tab connecting portion 37 are inserted.

As shown enlarged in FIG. 8, the seats 43 are each formed into a column and are arranged to provide a gap S therebetween to allow the busbar 36 to be inserted. The upper opening end of the insertion grooves 44 is provided with a tapered portion 44a as an insertion guide.

Figure 9:
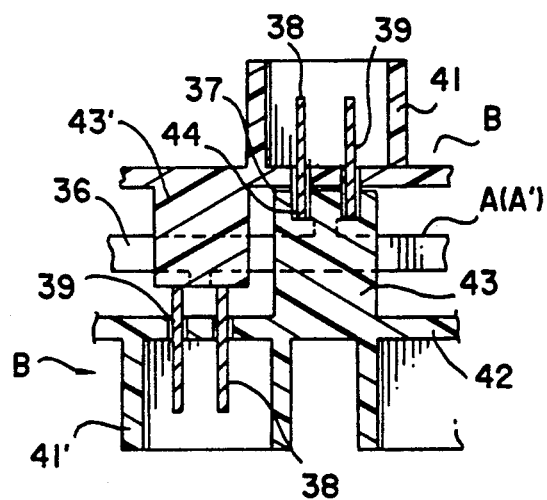
Figure 10:
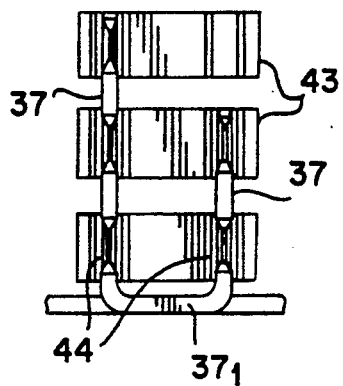

A ceiling wall 42' of the upper case B is provided at its inner surface with a plurality of projecting seats 43' for the lower tab connecting portions 37 of the branch connection busbars A, A', as shown in FIG. 9. The seats 43' have the same dimensions as the aforementioned seats 43 but, in this embodiment, are not provided with the insertion grooves 44.

Denoted 45 and 46 are engagement claws that form a locking means for the upper and lower cases B, B'.

The assembly of the branched junction box is carried out in the following procedure.

As shown in FIG. 9, the lower branched tabs 38 of the branch connection busbar A are inserted through the tab insertion holes 39 in the lower case B' into the connector insertion portion 41'.

Since the seats 43 of the lower case B' have the insertion grooves 44 cut in the upper surface on each side, the tab connecting pieces 37b of the upper tab connecting portions 37 are guided along the tapered portions 44a into the insertion grooves 44 where they are securely held. As a result, the upper group of branched tabs 38 of the branch connection busbar A are positioned, aligning themselves with the tab insertion holes 39 in the upper case B.

Then, the upper case B is mounted on the lower case B' and locked together by the locking means 45, 46. Now, the lower tab connecting portions 37 of the branch connection busbar A are clamped and securely held between the lower case B' and the seats 43' of the upper case B; and the upper tab connecting portions 37 are also firmly held between the upper case B and the seats 43 (insertion grooves 44) of the lower case B'.

The branch connection busbar A' with five-pole branched tabs 7 is also held in the same way as the branch connection busbar A. In this branch connection busbar A', however, the tab connecting portion $37_1$ has its tab connecting pieces $37b_1$ and $37b_2$ on each side positioned and held by three seats 43 and by two seats 43, respectively. Thus, the number of poles of the branched tabs 38 in one tab connecting portion 37 can be increased or reduced to a desired number.

While in the above embodiment the insertion grooves 44 are provided only to the seats 43 of the lower case B', it is also possible to eliminate the insertion grooves from the lower case seats 43 or provide them to the seats 43' of the upper case B, too.

As mentioned above, the branch connection busbars each consist of a busbar strip and a plurality of branched tabs which are formed on the upper and lower lateral edges of the busbar in such a way that the upper and lower branched tabs are staggered. The upper and lower cases that accommodate these branch connection busbars are provided at the outer surfaces with connector insertion portions at positions that correspond to the groups of branched tabs. This construction not only makes the branch junction box compact but also allows an increased number of internal circuits to be formed in the junction box.

Moreover, since the tab connecting portions of the branch connection busbars are firmly clamped and held between one case and the seats of another case, no trouble will occur such as the branched tabs becoming loose or dislocated. Particularly when the seats are formed with the insertion grooves for positioning the tab connecting portions, the branched tabs can be aligned with improved accuracy and the assembly work efficiency of the branch junction box can also be enhanced.

In FIGS. 3a and 3b, the busbar $18_1$ has a series of identical two-pole tabs 2T, each of which consists of two tabs 19 projecting one on each side of the tab connecting portions 20 that are spaced at predetermined pitches. On the other hand, the busbar $18_2$ has a more complex structure in which there are, from left to right, a three-pole tab 3T, a two-pole tab 2T and a five-pole tab 5T although the tab connecting portions 20, 21, 22 are spaced at the same pitches as in the first busbar $18_1$.

The above-mentioned branch connection busbars $18_1$, $18_2$, . . . have different branch patterns with differing shapes and numbers of branched tab poles and thus require their own special dies for punching.

This not only increases the cost of dies and therefore the manufacturing cost but also requires preparing a new die when there is any change in the pattern.

Figure 11:
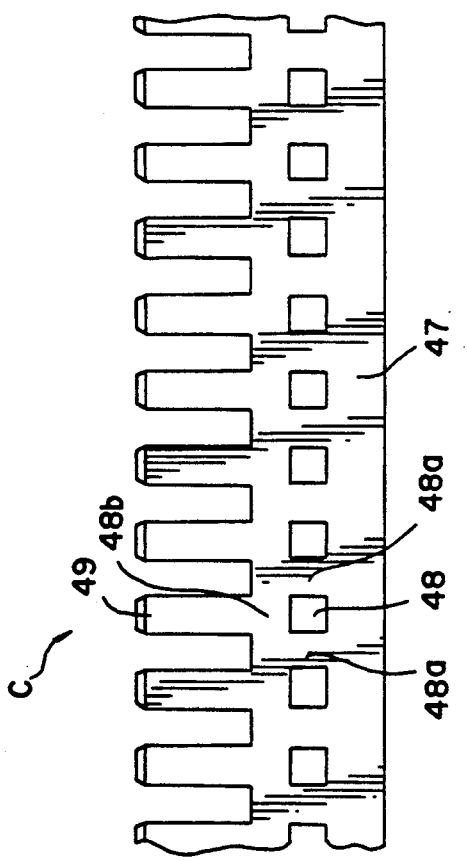
FIG. 11 is a developed view of one embodiment of a comblike branch connection busbar according to this invention.

This problem can be solved by the use of a comb-shaped branch connection busbar C as shown in FIG. 11. The branch connection busbar C consists of a base strip 47 and a series of branched tabs 49 arranged like a comb integrally connected to one side of the base strip 47 through perforated portions 48, which are spaced from each other at specified pitches.

Rising pieces 48a provided on each side of each perforated portion 48 correspond to the rising pieces 20a of the tab connecting portions 20 in FIG. 3. A lateral strip 48b provided at the top of the perforated portions 48 corresponds to the tab connecting pieces 20b connected in line.

This branch connection busbar C can be formed by punching a conductive metal plate made of such materials as brass, beryllium and copper with a single die.

Figure 12:
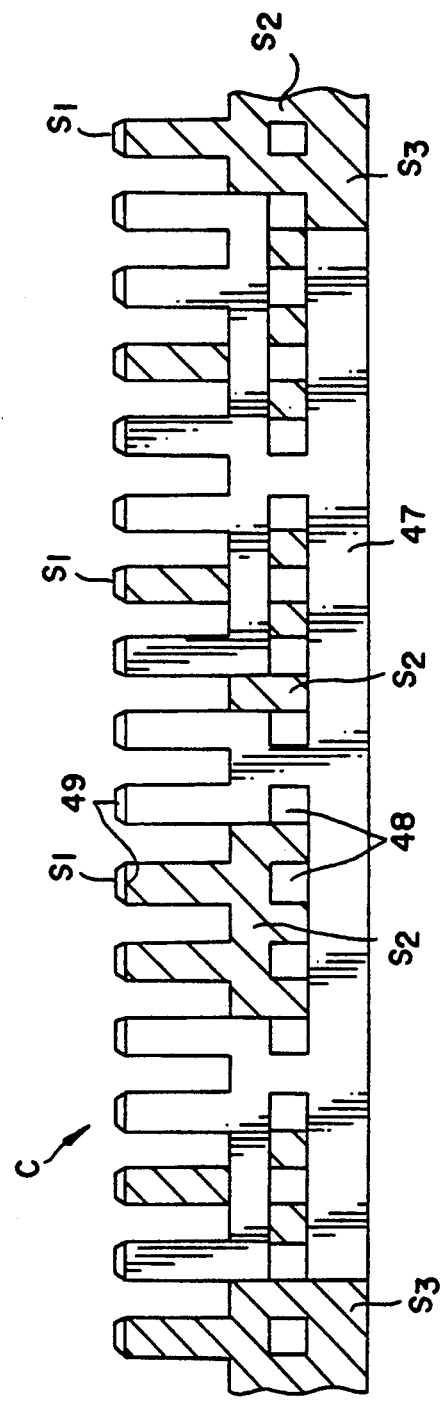
FIG. 12 is a developed view of the comblike branch connection busbar of FIG. 11, partly cut and separated.
Figure 14:
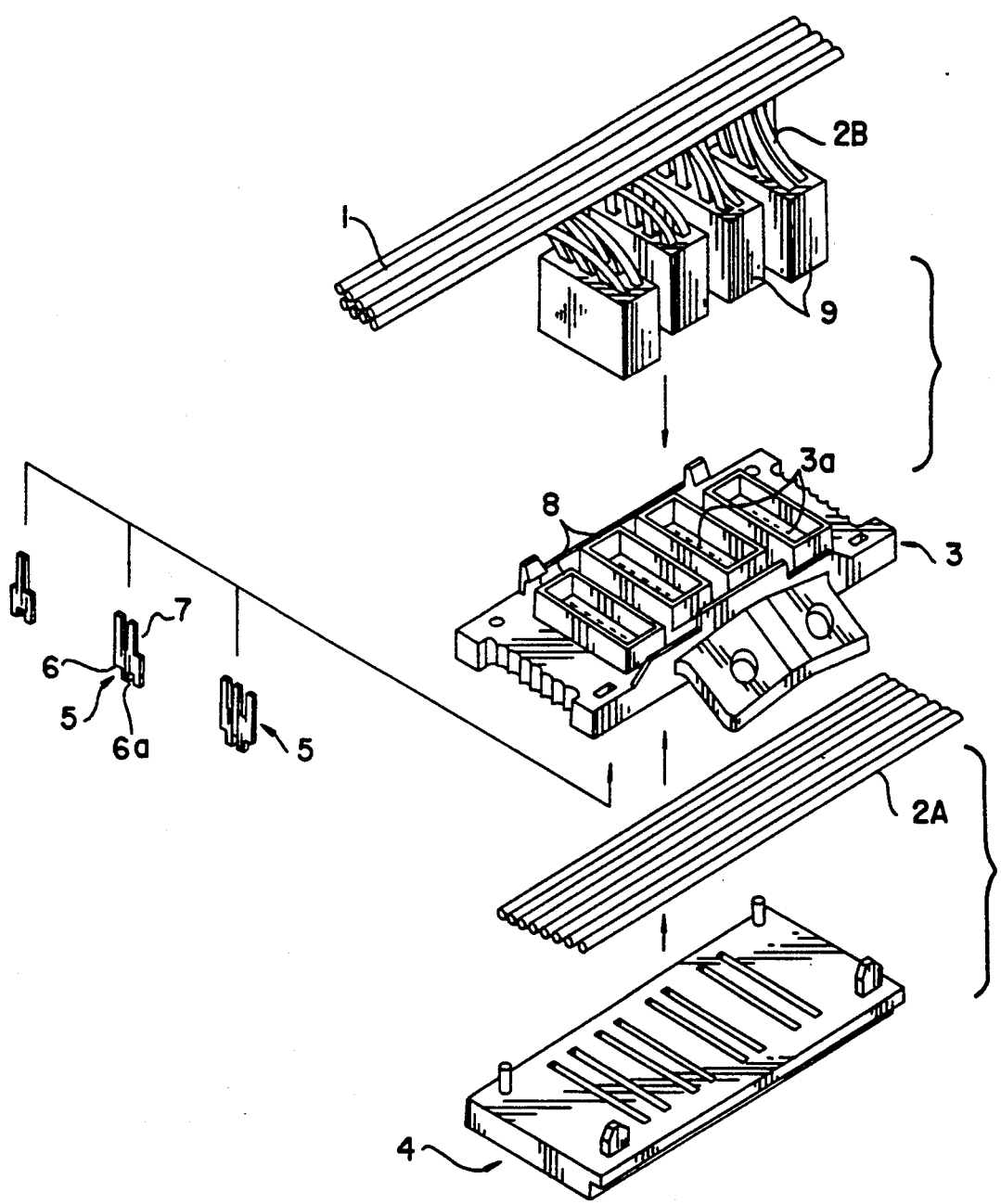
FIGS. 14 and 15 are exploded perspective views of conventional branch junction boxes.
Figure 15:
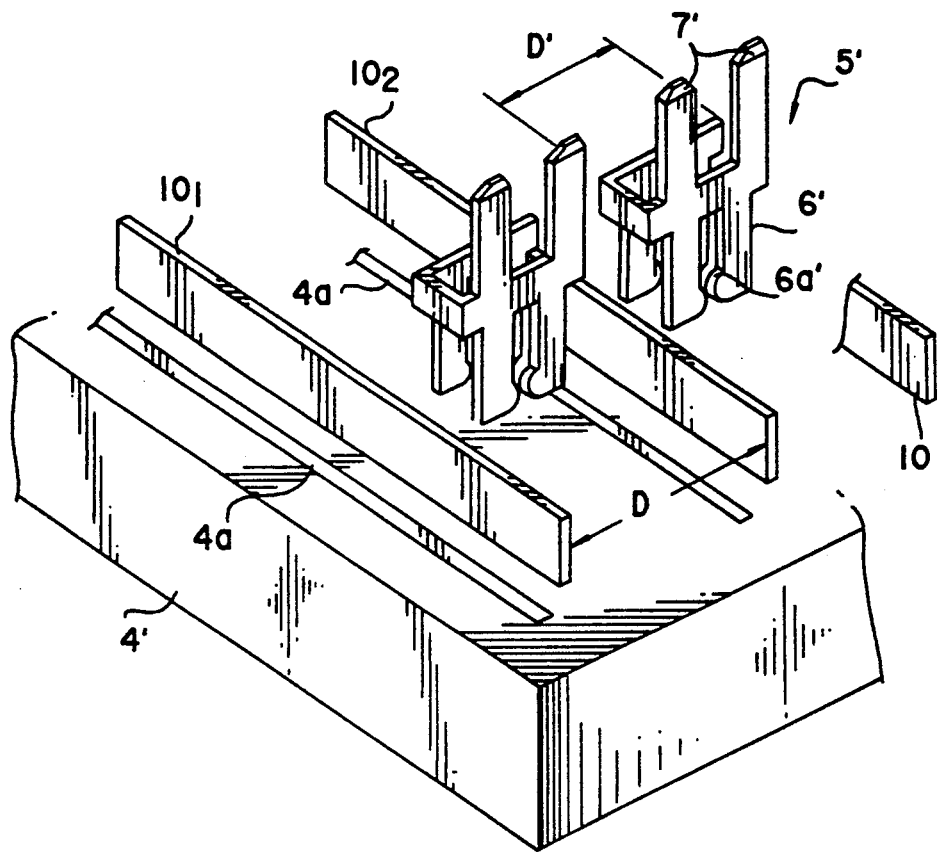
Figure 16:
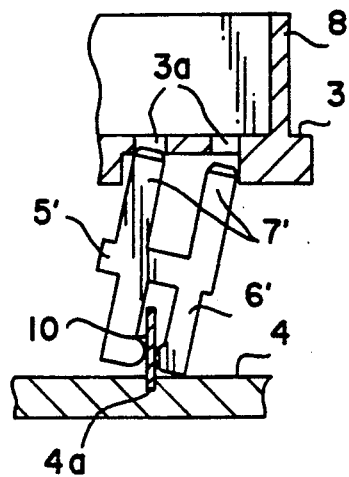
FIG. 16 is a cross section showing the action of a pressure terminal of FIG. 15.

With this branch connection busbar C, a busbar which has the same construction as the busbar $18_2$ of FIG. 3b can be manufactured by partially cutting off those branched tabs 49 shaded as $S_1$ in FIG. 12, those rising pieces 48a and/or lateral strip 48b of the perforated portions 48 shaded as $S_2$, and those portions of the base strip 47 shaded as $S_3$.

Appropriately selecting the cutting positions on the base strip 47, perforated portions 48 and branched tabs 49 forms a busbar with any desired branch pattern. The punching operation can be carried out with a single die, substantially reducing the manufacturing cost.

Figure 13:
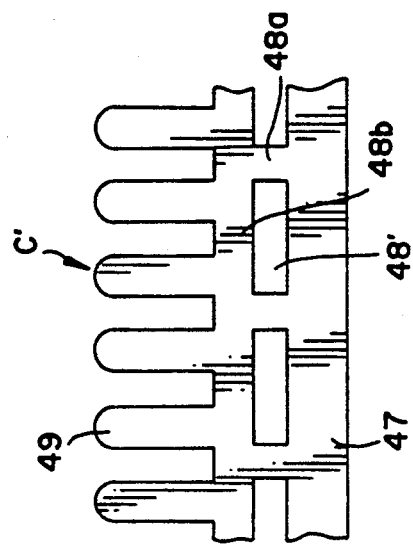
FIG. 13 is a developed view of another embodiment of a branch connection busbar according to this invention.

FIG. 13 shows another example of branch connection busbar C' with laterally elongate perforated portions 48', which are formed by removing every other rising piece 48a of the perforated portions 48 in FIG. 11.

In this way, the pitches of the perforated portions 48 or 48' and of the branched tabs 49 as well as other dimensions can be determined arbitrarily.

With the perforated portions 48' formed laterally elongate as shown in FIG. 13, it is possible to reduce the number of cut-off positions and cutting operations in making the branch connection busbar.

As mentioned above, it is possible to form a number of branch connection busbars with various branch patterns from the comb-shaped branch connection busbars with one and the same branch pattern, reducing the cost of die and therefore the cost of manufacture. The comb-shaped branch connection busbar also permits an easy and swift change to be made in the branch pattern.

What is claimed is:

1. A branch junction box comprising:
    an upper case and a lower case;
    a plurality of connector insertion portions provided on the upper case;
    a plurality of parallel busbar accommodating grooves formed in the lower case at equal intervals;
    a plurality of busbars each having a first lateral edge thereof installed in a respective said busbar accommodating groove and, at the second lateral edge, having branched tabs projected upwardly therefrom via tab connecting portions into the connector insertion portions;
    said tab connecting portions each consisting of: a rising piece extending upwardly from the second lateral edge of the busbar; and a tab connecting piece extending laterally on one side or both sides of the rising piece; said tab connecting pieces are bent at right angles to the plane of the busbar so that the branched tabs on said connecting pieces will protrude sideways from the busbar, the tab connecting pieces being formed with the upwardly projecting branched tabs; and
    an insulating plate formed with a plurality of insertion slits at positions corresponding to the tab connecting portions of the busbars to pass and project the branch tabs and tab connecting portions through the insertion slits of the insulating plate, and whereby the insulating plate is then slid laterally relative to the branched tabs to a position where it is securely held between the busbars and the tab connecting portions.

* * * * *